Dec. 20, 1955
A. J. JOHNSON
2,727,930
PROCESS AND APPARATUS FOR EFFECTING VAPOR
PHASE REACTIONS WITH POWDERED CATALYST
Filed May 15, 1953
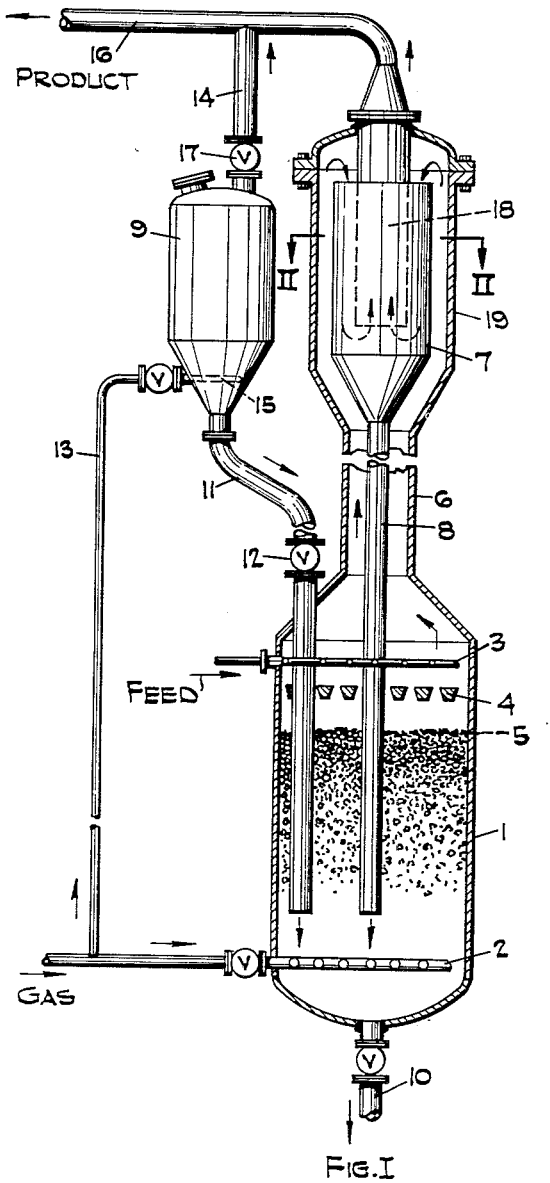
FIG. I
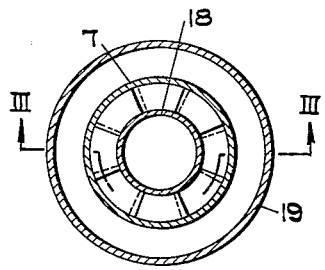
FIG. II
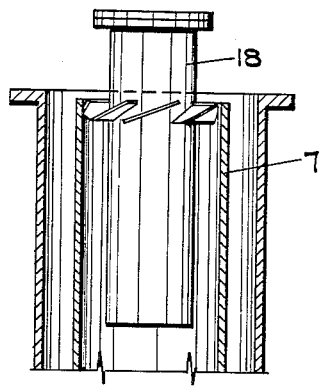
FIG. III
Inventor:
Ava J. Johnson
By James Todorovic
His Attorney

United States Patent Office 2,727,930
Patented Dec. 20, 1955

2,727,930

PROCESS AND APPARATUS FOR EFFECTING VAPOR PHASE REACTIONS WITH POWDERED CATALYST

Ava J. Johnson, Oakland, Calif., assignor to Shell Development Company, Emeryville, Calif., a corporation of Delaware Application May 15, 1953, Serial No. 355,282

9 Claims. (Cl. 260—668)

This invention relates to a process and apparatus for effecting vapor phase reactions with finely divided solid catalysts.

In carrying out vapor phase reactions or treatments with solid catalysts it is frequently desirable to employ the catalyst in a finely divided form. The chief advantages of using the catalyst in this form are that the catalyst may be simultaneously employed as a heat carrier or temperature regulator and that the catalyst may be fluidized and transported to various parts of the plant relatively easily. While these advantages are quite important in many cases, they are obtained at the expense of certain disadvantages which are also of importance.

If reactant vapors are passed up through a bed of finely divided catalyst at a velocity to maintain the catalyst in a fluidized (pseudo liquid) state, it is found that the temperature at all points within the fluidized bed is very uniform even when considerable amounts of heat are being introduced or withdrawn from the bed. This is in some respects very desirable. However, this uniform temperature is due to the fact that in fluidized beds of powder there is excellent mixing and this is a distinct disadvantage. Thus, like the temperature, the composition of the gas phase is substantially uniform throughout the fluidized catalyst bed. The concentration of unreacted reactant at the top (exit) of the bed is therefore essentially the same as near the bottom (entrance) and, due to the mixing, the concentration of the reaction product near the entrance of the bed is essentially the same as in the mixture withdrawn from the bed. Thus, such a uniform fluidized bed of catalyst is only about one-half as efficient as a fixed bed of the same catalyst content.

An object of my invention is to provide a new and improved apparatus and method of operation for vapor phase catalysis with finely divided catalyst wherein the advantages of mixing are utilized but the disadvantages are avoided. This object, broadly speaking, is achieved by effecting the reaction with concurrent flow of the reactant vapor and catalyst in a reaction zone of such small cross-section that the velocity is sufficiently high to retain the catalyst in suspension in the reactant gases.

In cases where the reaction is highly exothermic it is customary to remove the heat of reaction by means of cooling coils or tubes placed in the fluidized bed of catalyst. This is effective but costly as the heat exchange elements are subject to severe buffeting by the fluidized bed and also to erosion by the agitated solid catalyst particles. In some cases excessive temperature rise can be avoided by injecting cooled gas directly into the fluidized bed. This system is satisfactory in cases where the gas introduced is not harmful and a fluidized bed of the catalyst is employed. In other cases, such as when maintaining the catalyst in suspension in the flowing reactant vapors, this method is not efficient unless rather elaborate means are provided for introducing the cool gas at regulated rates at a number of points in the path of travel.

Another object of my invention is to provide a new and improved apparatus and mode of operation for vapor phase catalysis with finely divided catalyst whereby cooling may be effected by the introduction of cool gas in a more effective way. Broadly speaking, this object is accomplished in the process of my invention by injecting the cool gas into a fluidized bed of the catalyst to thereby cool the catalyst and then suspending the cooled catalyst in the reactant vapors and passing it in the suspended state through the reaction zone.

In cases where the reaction is endothermic the same problems and shortcomings are encountered as in the case of exothermic reactions and for much the same reasons. In this case as much heat as possible is generally supplied with the reactant which means that the reactant feed is preheated to about the highest temperature that it can stand. It is then difficult to supply the additional heat without overheating the reactant feed.

A further object of my invention is to provide a new and improved apparatus and mode of operation for vapor phase endothermic reactions with finely divided catalyst wherein the required sensible heat may be supplied without overheating the reactant vapors. Broadly speaking this object is accomplished by preheating diluent gas, transferring the sensible heat of the gas to the catalyst in a fluidized bed, and then suspending the preheated catalyst in the reactant vapors.

In systems where the finely divided catalyst is also used as a heat carrier, either to supply or remove heat, the catalyst is cycled within the system and the amount of heat transferred depends upon the amount of catalyst circulated. The amount of catalyst circulated is then dependent upon the amount of reactant and is fixed with respect thereto. Thus, the catalyst is circulated in an amount to give the desired catalyst-to-reactant ratio. The catalyst-to-reactant ratio is also adjusted in many cases to control the extent or degree of conversion. The reactant feed rate is generally fixed or independently controlled and the flow of the catalyst is then controlled by means of one or more suitable control valves, e. g., slide valves placed in the catalyst flow lines. Valves suitable for this control are costly and subject to severe wear. In some cases, mechanical feeders such as screw feeders or star feeders have been used to control the catalyst flow. Mechanical feeding devices are even less satisfactory since they are subject to the same disadvantages and, in addition, they tend to disintegrate the catalyst particles. Some arrangements have been suggested whereby the flow of catalyst to give the desired catalyst-to-reactant ratio can be controlled without the use of such valves or mechanical feeding devices. These systems, however, involve separate control of a gaseous carrying medium which may be a reactant. Control by this means allows only a small variation in the flow rate of catalyst and generally involves upsetting the system somewhat due to variation in the gas flow rates.

A further object of my invention is to provide a new and improved apparatus and mode of operation for vapor phase catalysis with finely divided catalyst wherein the catalyst-to-reactant ratio may be controlled without any control valve or equivalent mechanical device in the catalyst circulation system and, if desired, also without altering the amount of gas used. This object is accomplished in my invention by the hereinafter described combination of a fluidized catalyst bed below the reaction zone and concurrent flow of suspended catalyst in the reaction zone in which system the rate of catalyst flow is controlled by adjusting the inventory of circulating catalyst in the system.

The above objects and others which will be apparent are achieved by the process and apparatus which will be described in more detail with reference to the accompanying drawing. Referring to the drawing, Figure I is an elevational view illustrating one modification of an apparatus arranged and designed in accordance with the principles of my invention. Figure II is a plan view of the same apparatus taken through the plane II—II of Figure I. Figure III is a partial section taken through the plane III—III of Figure II.

In broad outline the apparatus of my invention comprises a vessel 1 of relatively large diameter provided with means 2 for injecting a diluent gas, generally free from catalyst, at the bottom, and provided near the top thereof, preferably about as indicated, with means 3 for injecting the reactant. The vessel 1 is provided with a grid 4 which is located above the normal working level 5 of the fluidized bed and below means 3. It is generally recommended to place the grid at about level of the top of the cylindrical portion of the vessel as illustrated. If an elliptical head is applied instead of the conical section illustrated, it may be desirable to lower the position of the grid somewhat. The grid may consist of a series of parallel spaced girders as illustrated, or it may consist of a plate containing suitable holes or slots. The free area of the grid, i. e., the per cent of the total area allowed for passage of the gas and catalyst is adjusted in accordance with the amount of gas to be passed. Generally, the free area is adjusted in accordance with the intended throughput to give a pressure drop across the grid between about 0.1 and 0.8 p. s. i. g. The grid 4 has three important functions. The first is its function as a restriction thereby serving as a reference level for control of the level of the lower fluidized bed. The second is its function as a baffle preventing slugs of suspended catalyst from passing into the upper space. The third is its function as a mixing barrier to prevent feed and catalyst from passing from the upper zone into the lower zone. While the grid 4 or its equivalent is important for proper operation, it does not follow that additional grids are beneficial.

The diameter of the vessel 1 is sufficiently large that the required fluidized catalyst bed will exist at the desired rate of gas injection. A superficial gas velocity of at least 2 feet per second and preferably 2–5 feet per second is generally to be recommended.

Above the feed inlet means 3, the vessel 1 is restricted in diameter to and joins a narrow cylindrical reaction vessel 6 which extends upwardly for a certain distance and discharges directly into a centrifugal type separator (cyclone separator). The diameter of the upper reaction section 6 and the area of the circular space between the cyclone housing 19 and the cyclone 7 are adjusted such that the superficial vapor velocity is between about 25 and 50 feet per second. Thus, if the diameter of vessel 1 is 10 feet, the diameter of vessel 6 may be, for example, about 3 feet. The length of vessel 6 is chosen to afford the desired reaction time at the stated flow rate and may be, for example, about 25 to 50 feet. Line 8 is provided to return catalyst collected in the separator back to a low position in vessel 1.

The apparatus also comprises a catalyst vessel 9 suitably connected to transfer catalyst to vessel 1 as needed. In the apparatus illustrated a catalyst drawoff line 10 is provided at the bottom of vessel 1 to allow reduction in the catalyst inventory. To increase the inventory, catalyst is withdrawn from the vessel 9 and passed to vessel 1 by line 11. Valve 12 is, therefore, normally closed and is opened only when it is desired to increase the catalyst inventory. Valved lines 13 and 14 are provided to aid in the catalyst transfer. Thus, line 13 supplies a small amount of gas to the distributor 15 to fluff up the catalyst and make it flow easily. This gas is vented by line 14 to the product vapor line 16. Valve 17 may be throttled somewhat thereby increasing the pressure in vessel 9 somewhat.

In operation the flow of the catalyst is from the dense fluid bed in vessel 1 up through the grid 4 in suspension, through the reactor vessel 6 into the separator 7, and back to vessel 1 via line 8. It will be noted that no valve or mechanical flow control means is required in this path. The reactant vapor flow is from distributor 3 up through the reactor vessel 6, through the separator 7, and out via the product line 16.

In my invention I make use of the fact that the concentration of suspended catalyst in the space between the top of the fluid bed 5 and the grid 4 varies at a given gas rate with the distance between these two points over a range affording catalyst rates of the desired order of magnitude. Thus, the amount of catalyst transported up through the grid 4 is controlled with any given gas flow by practical variation in the level of the fluidized bed. This level is controlled by adding or removing catalyst to or from the vessel. The ratio of catalyst to reactant may be controlled at any desired value in the practical range from 1 to about 20 in this way.

In the operation according to my invention, therefore, a relatively fixed quantity of gas is introduced into the fluidized bed of catalyst by distributor 2. The level of the fluidized bed in vessel 1 is adjusted either by withdrawing some catalyst by line 10 or adding some catalyst from vessel 9 so that the amount of catalyst to give the desired catalyst-to-reactant ratio passes up through grid 4. The reactant vapor is introduced by distributor 3 above the grid 4. As a result of the increased gas volume, all of the catalyst above grid 4 remains dispersed in the gas, i. e., there is no catalyst present in a pseudo liquid state. The reaction is then carried out while the suspension passes upwardly through the chamber 6. Due to the relatively restricted cross-section of chamber 6 the gas velocity is high and the velocity of the suspended catalyst approaches closely that of the gas. Thus, there is little slippage and substantially no back mixing. This high velocity generally allows the suspension to be efficiently separated in the centrifugal separator without first increasing its velocity by a further restriction at the separator entrance.

In normal operation the reactant feed vapors are brought to a suitable temperature prior to introduction into the reactor via the distributor 3. If the reaction is accompanied by a substantial heat effect, it generally is not possible, however, to obtain the desired reaction temperature without supplying or removing additional heat by other means. In the system of my invention all such transfer of heat is effected by regulating the temperature of the auxiliary gas injected by distributor 2. Thus, if the reaction is exothermic, the gas so introduced is at a temperature below the desired reaction temperature and, if the reaction is endothermic, the gas so introduced is heated to such a temperature that the required amount of sensible heat is supplied.

While the desired supply of sensible heat or cooling is effected through control of the temperature of the auxiliary gas, an important feature of my invention is that the heat is not transferred to or from the reactant directly with said gas but is first transferred to the catalyst in the fluidized bed and then from the catalyst to the reactant in the upper reaction zone. This changes the temperature profile along the length of the reactor 6. Thus, if the reaction is a relatively slow one and relatively large catalyst particles are used, e. g. 1 mm. diameter, the particles take up or give off heat for an appreciable time, thereby exerting an effect throughout the length of the reaction zone. If, on the other hand, the reaction is a very fast one, catalyst particles which pass a 100 mesh screen may, for example, be advantageously used. Such particles come to temperature equilibrium with the gas phase more rapidly, thereby supplying or removing the desired heat mostly in the forepart of the reaction zone where most of the reaction takes place. Thus, for example, in the dehydrogenation of naphthenic hydrocarbons with a platinum-on-alumina catalyst, in which case the auxiliary gas may advantageously be hydrogen, approximately 75% conversion can be obtained at the very high space velocity of 250 (liquid hourly space velocity). This corresponds to a contact time of only a few thousandths of a second. For this case, catalyst particles under about 300 microns diameter are preferred. Also, it is desirable in this case to apply the platinum only to the outside of the catalyst particles or to employ catalyst particles having a relatively dense and non-porous core.

Since it is important, both from the standpoint of maintaining the desired degree of conversion and from the standpoint of providing the required amount of heat transfer, that the catalyst-to-reactant ratio in the reaction zone 6 be maintained at the desired value and, since in any such system the volume of circulating catalyst is prone to change due to unavoidable losses and changes in density caused by changes in particle size distribution, the level 5 requires frequent adjustment. This adjustment may be done manually but is best done automatically through the use of suitable control instruments (not shown). Thus, by way of example, the level 5 may be continuously measured by a conventional differential pressure recorder-controller instrument in the usual way by measuring the differential pressure between points above and below the level and this instrument may be arranged to open valve 12 whenever the level is too low and open the valve in the discharge line 10 whenever the level becomes too high. The level 5 thus maintained is set to provide the catalyst-to-reactant ratio giving the desired conversion and temperature in the reactor 6. If desired, a temperature recorder-controller instrument which measures the temperature in reactor 6 may be arranged to regulate valve 12 and the valve in line 10. While it is generally desired to introduce a steady predetermined amount of diluent gas by distributor 2, this stream may also be varied if desired. As the gas flow rate is increased, the rate of catalyst circulation and, therefore, the catalyst-to-reactant ratio is increased, and vice versa, with little change in the level of the fluidized bed. Also, change in this gas rate affects the total heat input. For this reason, variation of this gas flow rate is not recommended for control purposes but may be usefully adjusted from time to time to set the range in which the catalyst to oil ratio is to be maintained by control of the level of the fluidized bed.

The process and apparatus of the invention are useful for carrying out a wide variety of vapor phase reactions which are catalyzed by finely divided solid catalysts. They are particularly suitable for effecting reactions which are relatively fast, and particularly those which are accompanied by a substantial heat effect. Thus, they are particularly advantageous for carrying out oxidation reactions, dehydrogenation reactions, some hydrogenation reactions, pyrolyses, and the like. One particular application of immediate interest is in the dehydrogenation of hydrocarbon materials, for example the dehydrogenation of naphthenic petroleum fractions.

In carrying out these various reactions, any of the solid catalysts conventionally used for the reaction may be employed. It is merely necessary that the catalyst be sufficiently finely divided to be fluidized. In general, due to the attrition which takes place in the system during operation, the catalyst tends to reach a more or less steady state of particle size distribution which is dependent upon the attrition resistance of the catalyst and upon the rate of replacement of catalyst with fresh catalyst. At this steady state practically all of the catalyst will pass a 100 mesh standard sieve, even if somewhat larger particles, e. g., 1 mm. diameter, are supplied to maintain the activity and to make up for catalyst losses.

The diluent gas supplied via distributor 2 may be any substantially inert diluent gas which does not adversely affect the desired conversion. Thus, depending upon the particular reaction, this gas may be flue gas, carbon dioxide, carbon monoxide, water gas, methane, nitrogen, hydrogen, or steam. In the dehydrogenation of hydrocarbons at temperatures above about 500° F., a recycled portion of the product gas consisting mainly of hydrogen is quite suitable. The diluent gas is preheated or cooled by suitable means (not shown) in accordance with the nature of the reaction to supply or take up the required heat.

I claim as my invention:

1. In a process for effecting a vapor phase reaction with a finely divided solid catalyst, the combination of process steps comprising, maintaining a bed of finely divided catalyst in a fluidized state in a lower zone by the passage therethrough of a diluent gas, injecting reactant vapors above the said bed of fluidized catalyst into the said diluent gas issuing from said bed and passing the resulting mixture along with suspended catalyst particles up through a long narrow reaction zone to a centrifugal separation zone, separating suspended catalyst from the gas mixture in said centrifugal separation zone, passing the separated catalyst particles from said centrifugal separation zone as a confined column by gravity back to said fluidized bed, and regulating the ratio of suspended catalyst to vapors in said narrow reaction zone by regulating the level of the said fluidized bed in said lower zone.

2. In a process for effecting an endothermic vapor phase reaction with a finely divided solid catalyst, the combination of process steps comprising maintaining a bed of finely divided catalyst in a fluidized state and at a temperature above the desired reaction temperature in a lower zone by the passage through said catalyst of a diluent gas preheated to a temperature above the desired reaction temperature, injecting reactant vapors above the said bed of fluidized catalyst into the partially cooled diluent gas issuing from said bed and passing the resulting mixture along with suspended catalyst particles up through a long, narrow reaction zone at the desired reaction temperature to a centrifugal separation zone, separating suspended catalyst from the gas mixture in said centrifugal separation zone, passing the separated catalyst particles from said centrifugal separation zone as a confined column by gravity back to said fluidized bed, and maintaining a desired ratio of suspended catalyst to vapors in said narrow reaction zone by addition and withdrawal of catalyst to and from the said fluidized bed in said lower zone.

3. In a process for effecting an exothermic reaction with finely divided solid catalyst, the combination of process steps comprising maintaining a bed of finely divided catalyst in a fluidized state and at a temperature below the desired reaction temperature in a lower zone by the passage therethrough of a relatively cool diluent gas, injecting reactant vapors above the said bed of fluidized catalyst into the said diluent gas issuing from said bed and passing the resulting mixture along with suspended catalyst particles up through a long narrow reaction zone to a centrifugal separation zone, separating suspended catalyst from the gas mixture in said centrifugal separation zone, passing the separated catalyst particles from said centrifugal separation zone as a confined column by gravity back to said fluidized bed, and maintaining a desired ratio of suspended catalyst to vapors in said narrow reaction zone by controlling the level of the said fluidized bed in said lower zone.

4. In a process for the endothermic vapor phase dehydrogenation of a hydrocarbon with a finely divided solid dehydrogenation catalyst, the process steps comprising maintaining a bed of finely divided dehydrogenation catalyst in a fluidized state and at a temperature higher than the desired dehydrogenation temperature in a lower zone by the passage therethrough of hydrogen preheated to a temperature above the desired dehydrogenation temperature, injecting vapors of the hydrocarbon to be dehydrogenated above the said bed of fluidized dehydrogenation catalyst into the partially cooled hydrogen issuing from said bed and passing the mixture along with suspended catalyst particles up through a narrow reaction zone to a centrifugal separation zone, separating suspended catalyst from the gas mixture in said centrifugal separation zone, passing the separated catalyst particles from said centrifugal separation zone as a confined column by gravity back to said fluidized bed, and regulating the ratio of suspended catalyst to vapors in said narrow reaction zone by regulating the level of the said fluidized bed in said lower zone.

5. In a process for effecting a vapor phase reaction with a finely divided solid catalyst, the combination of process steps comprising passing a diluent gas up through a bed of the finely divided catalyst in a lower zone at a superficial gas velocity between about 2 and 5 feet per second, thereby maintaining said catalyst in a pseudo liquid state in said zone, increasing the superficial gas velocity of said diluent gas above said bed thereby to retain suspended catalyst particles in suspension, injecting reactant vapors into the resulting suspension and passing the mixture upward through a narrow reaction zone at a superficial gas velocity between about 25 and 50 feet per second, passing the mixture from said reaction zone to a centrifugal separation zone wherein suspended catalyst particles are separated from the gas, withdrawing the gas, returning the separated catalyst to said fluidized bed as a confined dense stream by gravity flow, and controlling the ratio of suspended catalyst to reactant vapors to effect the desired conversion by controlling the amount of catalyst in said bed in said lower zone.

6. In a process for effecting an endothermic vapor phase reaction with a finely divided solid catalyst, the combination of process steps comprising passing a diluent gas preheated to a temperature above the desired reaction temperature up through a bed of the finely divided catalyst in a lower zone at a superficial gas velocity between about 2 and 5 feet per second thereby maintaining said catalyst in a pseudo liquid state in said zone and preheating the same to a temperature above the desired reaction temperature while partially cooling said gas, increasing the superficial gas velocity of said diluent gas above said bed, thereby to retain suspended preheated catalyst particles in suspension, injecting reactant vapors into the resulting suspension and passing the mixture upward through a narrow reaction zone at a superficial gas velocity between about 25 and 50 feet per second and at the desired reaction temperature, passing the mixture from said reaction zone to a centrifugal separation zone wherein suspended catalyst particles are separated from the gas, withdrawing the gas, returning the separated catalyst to said bed in said lower zone as a confined dense stream by gravity flow, and controlling the ratio of suspended catalyst to reactant vapors to effect the desired conversion by controlling the amount of catalyst in said bed in said lower zone.

7. In a process for effecting the endothermic vapors phase dehydrogenation of a hydrocarbon with a finely divided solid dehydrogenation catalyst, the combination of process steps comprising passing a diluent gas consisting mainly of hydrogen and preheated to a temperature above the desired dehydrogenation temperature up through a bed of the finely divided dehydrogenation catalyst in a lower zone at a superficial gas velocity between about 2 and 5 feet per second thereby maintaining said catalyst in said zone in a pseudo liquid state and preheating the same to a temperature above the desired dehydrogenation temperature, increasing the superficial gas velocity of the gas issuing from said bed of pseudo liquid catalyst thereby to retain suspended catalyst particles in suspension, injecting the hydrocarbon to be dehydrogenated into the resulting suspension and passing the mixture upward through a tubular reaction zone at a superficial gas velocity between about 25 and 50 feet per second and at the desired reaction temperature, passing the mixture from said reaction zone to a centrifugal separation zone wherein suspended catalyst particles are separated from the gas, withdrawing the gas, returning the separated catalyst to said bed of catalyst in said lower zone as a confined dense stream by gravity flow, and controlling the ratio of suspended catalyst to hydrocarbon vapors to effect the desired conversion by controlling the amount of catalyst in said bed in said lower zone.

8. An apparatus adapted to effect vapor phase reactions with a finely divided solid catalyst which comprises in combination a vertically disposed cylindrical vessel of relatively large diameter closed at the bottom except for a catalyst withdrawal line and connected at the top with a long vertically disposed tubular reactor of relatively narrow diameter, means for injecting and distributing a gas in said vessel near the bottom thereof, a relatively open grid within said vessel near the top, means for injecting reactant vapors into said vessel above said grid, a centrifugal separator provided with vapor discharge line and separated catalyst return line at the top of said tubular reactor arranged such that vapors passing up through said tubular reactor are forced to pass through said centrifugal separator, said catalyst return line being arranged to discharge separated catalyst directly back into said vessel, a separate catalyst storage vessel with conduit means for transferring stored catalyst to the first said vessel, and a pressure equalizing line communicating between the top of said catalyst storage vessel and the said vapors discharge line of said centrifugal separator.

9. An apparatus adapted to effect vapor phase reactions with finely divided solid catalyst which comprises in combination two superimposed cylindrical vertically disposed vessels interconnected by a long vertically disposed reaction tube of relatively small horizontal cross-section, a cyclone separator provided with vapor discharge line and separated catalyst return line mounted within the upper of said vessels, the lower end of said separated catalyst return line being in the lower of said vessels and the horizontal cross-sectional free area between said upper vessel and said cyclone being approximately equal to that of the said reaction tube, and the horizontal cross-sectional area of said lower vessel being considerably larger, a horizontal grid in said lower vessel near the top thereof, a separate catalyst storage vessel mounted above the lower of said vessels and provided with conduit means for feeding a controlled amount of catalyst from said catalyst storage vessel to said lower vessel, means for injecting a first gas near the bottom of said lower vessel below said grid, separate means for injecting a reactant vapor into said lower vessel above said grid, and means for withdrawing a controlled amount of catalyst from the said lower vessel near the bottom thereof.

References Cited in the file of this patent

UNITED STATES PATENTS

| | | |
|---|---|---|
| 2,506,307 | Martin | May 2, 1950 |
| 2,558,194 | Orescon | June 26, 1951 |